Nov. 14, 1950 — L. TARWATER — 2,529,854
COMBINATION LOCK NUT AND WASHER
Filed Nov. 19, 1945
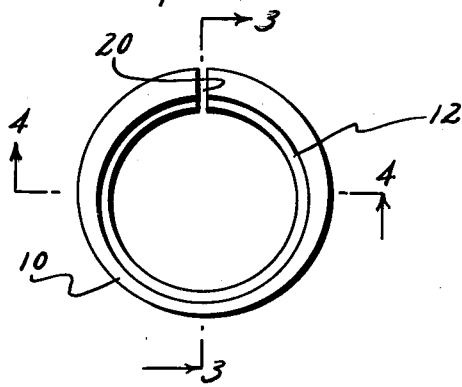
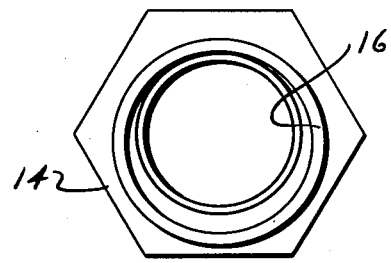
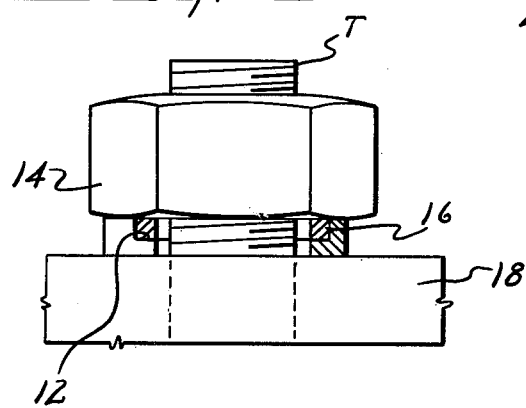
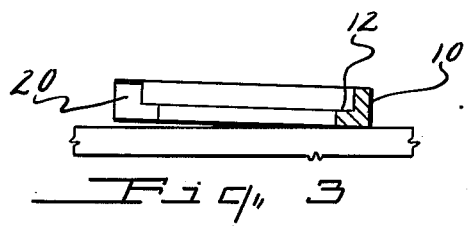
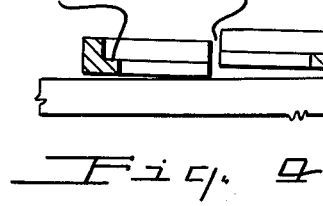
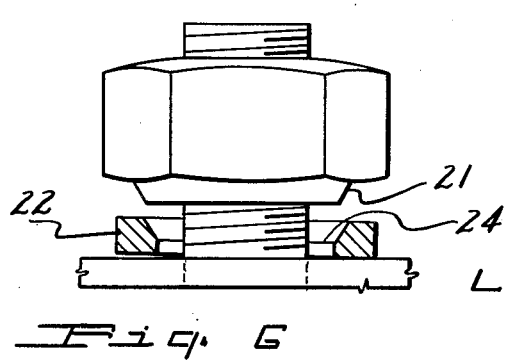
INVENTOR.
Lawson Tarwater
BY Mason & Graham
Attys Patented Nov. 14, 1950

2,529,854

UNITED STATES PATENT OFFICE 2,529,854

COMBINATION LOCK NUT AND WASHER

Lawson Tarwater, Redlands, Calif., assignor, by direct and mesne assignments, of one-third to Norman P. Marshall, one-third to William S. Marshall, and one-third to George Henry Ide, all of Redlands, Calif.

Application November 19, 1945, Serial No. 629,504

4 Claims. (Cl. 151—19)

My invention relates to lock nuts, having more particularly to do with a nut and split spiral spring washer construction for locking the nut on a threaded member. The invention is particularly designed for but is not limited to use under conditions of very heavy load and vibration, such as in holding down railroad rails at intersections or over especially heavily travelled sections of railroad, although it is of value wherever exceptionally severe conditions have to be met.

It is an object of the invention to provide a resilient lock washer and nut construction in which the nut and washer are provided with interengaging faces acting to secure a lateral thrust of the nut against the threaded member in addition to the axial thrust resulting from the resilience of the lock washer.

Another object of the invention is to provide a lock washer and nut construction which, although resulting in a much improved holding of the nut on the threaded member, is simple to manufacture.

Further objects and features of the invention will appear in the following description taken in conjunction with the accompanying drawings, in which:

Fig. 1 is a top plan of the washer constructed according to one form of the invention;

Fig. 2 is a bottom plan view of a nut provided with parts cooperating with the washer shown in Fig. 1;

Fig. 3 is a section taken on line 3—3 of Fig. 1, the washer being shown as held down at its lower thick end;

Fig. 4 is a section on line 4—4 of Fig. 1;

Fig. 5 is a view, partly in side elevation and partly in section, of a "made up" nut and washer; and Fig. 6 is a modified form of the nut and washer of my invention, the washer being shown in position on a threaded member on which is mounted a nut shaped to cooperate with the washer.

Referring now to Fig. 1, the numeral 10 indicates the body of the washer, which is of the spiral split spring type. The washer is countersunk as indicated at 12 to provide an eccentrically positioned recess. The nut is formed with parts cooperating with the washer as shown in Fig. 2, in which the body of the nut 14 is provided with a depending flange or shoulder 16 preferably having a similar degree of eccentricity to the axis of the bore through the nut as the recess 12 in the washer 10.

In this form of the invention, the depending shoulder 16 will enter the recess 12 in the washer 10 when the nut is tightened up, the washer turning with the nut until the pressure exerted by the nut on the washer becomes so great that the washer is held against rotation by the work, which will occur when the nut can be tightened only a turn or so on the threaded member, such as the stud T projecting from a work member 18.

By virtue of the eccentric shoulder 16, the last portion of the forward rotative movement of the nut will effect a lateral displacement of the washer and result in a strong sideward pressure of the nut upon the threaded member, which will, in addition, be subjected to the axial force due to the resilience of the spiral spring washer. The final position of the parts is shown in Fig. 5, in which it will be noted that the nut 14 is firmly engaged against the washer 10, clamping it against the work 18.

Lock washers of the construction above described have been installed on a stretch of heavily travelled railroad track and have shown many times the holding capacity of conventional forms of lock washers and nuts.

In forming the washers of the kind described, the steel from which the washers are made is soft while the recess is being formed and the washer split as indicated at 20. After the forming operation the washers are heat treated to spring temper.

In the form of the invention shown in Fig. 6, the nut is provided with a concentrically arranged depending flange or shoulder 21 which is tapered inwardly, although the shoulder may be eccentric if desired. The washer 22, designed to cooperate with the nut, is of the split spiral spring type and is formed with the recess 24 therethrough arranged slightly off center or eccentrically, and the wall of the recess is sloped to conform with shoulder 21 of the nut. In this form of the invention the action of the nut, when tightened up against the washer, is to force the nut into engagement with the washer and when fully entered therein will distort part of the washer outwardly, the remainder of the washer being held by friction, due to the force exerted by the nut, from centering itself on the nut, resulting in a sideward thrust of the nut against the threaded member in addition to the axial thrust against the threads due to the resilience of the shape of the washer.

It is to be understood that the scope of the invention, as defined by the accompanying claims, is not in any way intended to be limited by this

I claim:

1. Lock nut and washer means for use in combination with a bolt extending through a work element or the like providing a flat face against which the said means can be tightened comprising a nut member having a depending flange providing a circular shoulder eccentrically disposed with relation to the axis of the threaded bore of the nut, a resilient spirally shaped split washer adapted to be positioned against the work element, said washer having a circular recess for the reception of the flange portion of said nut, whereby tightening of said nut against said washer serves to flatten said washer into tight engagement with said work element and subsequently causes said recess and said flange to cooperate to exert lateral thrust on said nut and securely lock the same on the bolt.

2. Lock nut and washer means for use in combination with a bolt extending through a work element or the like providing a flat face against which the said means can be tightened comprising a nut member having a depending flange providing a circular shoulder eccentrically disposed with relation to the axis of the threaded bore of the nut, a resilient spirally shaped split washer adapted to be positioned against the work element, said washer having a circular recess for the reception of the flange portion of said nut, the outer wall of said recess being eccentrically disposed with relation to the axis of the hole through the washer whereby tightening of said nut against said washer serves to flatten said washer into tight engagement with said work element and subsequently causes said recess and said flange to cooperate to exert lateral thrust on said nut and securely lock the same on the bolt.

3. Lock nut and washer means as defined in claim 2 in which said shoulder on the flange of said nut and said outer wall of said recess are correspondingly inclined to the axis of the nut and washer.

4. Lock nut and washer means as defined in claim 2 in which the outer wall of said recess is parallel to the axis of the washer.

LAWSON TARWATER.

REFERENCES CITED

The following references are of record in the file of this patent:

UNITED STATES PATENTS

| Number | Name | Date |
|---|---|---|
| 205,712 | Whitmarsh | July 2, 1878 |
| 398,535 | Patten | Feb. 26, 1889 |
| 970,101 | Omalia | Sept. 13, 1910 |
| 1,020,178 | Battin | Mar. 12, 1912 |
| 1,149,329 | Boug | Aug. 10, 1915 |
| 1,793,141 | Stoll | Feb. 17, 1931 |
| 2,391,279 | Tarwater et al. | Dec. 18, 1945 |